ABBR# UNITED STATES PATENT OFFICE.

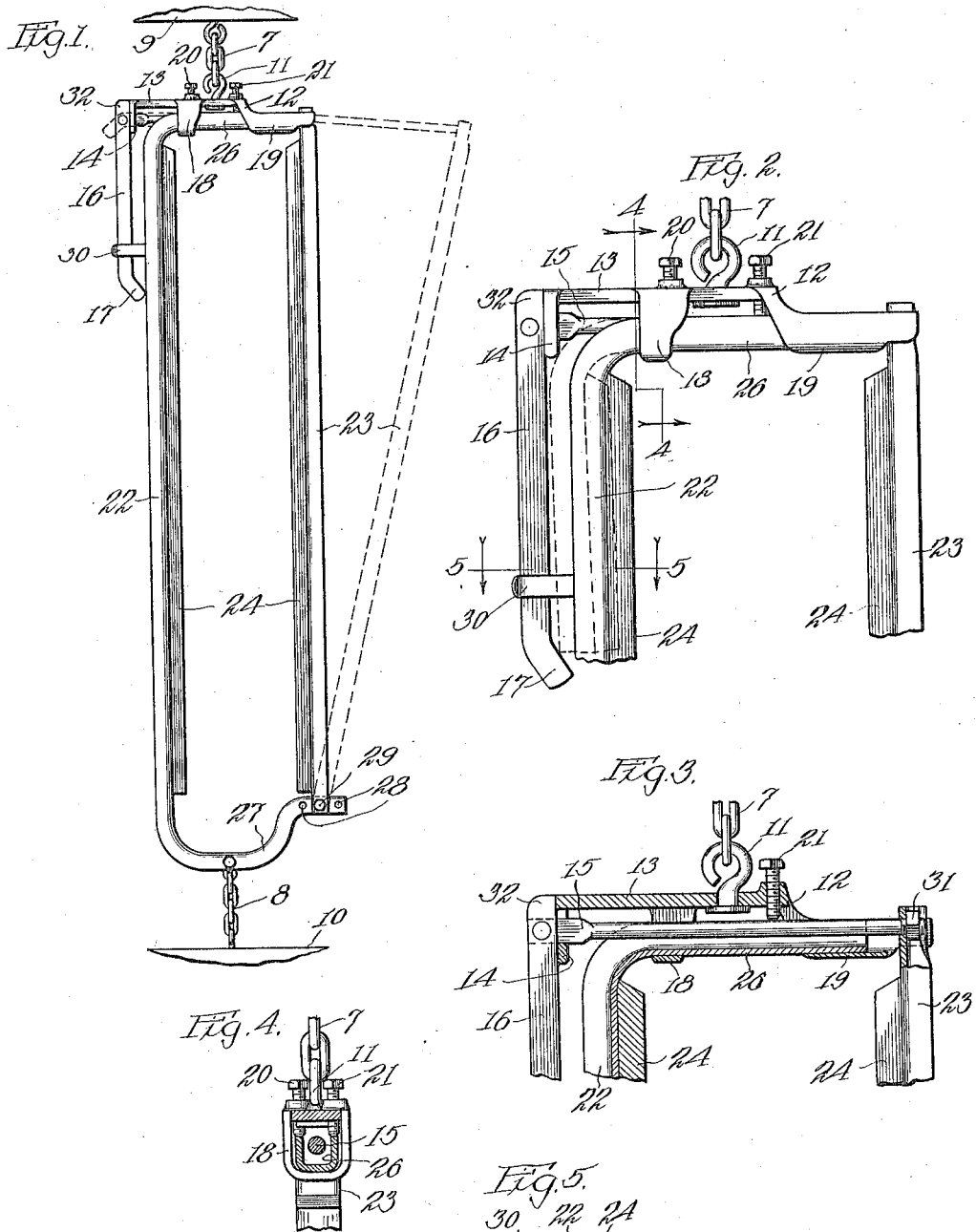

JEREMIAH C. FITZGERALD, OF KILBOURN, WISCONSIN, ASSIGNOR TO FELKER BROS. MFG. CO., A COPARTNERSHIP COMPOSED OF ALBERT G. FELKER, D. LEIGHTON MILLER, RAYMOND T. FINUCANE, AND LOUIS H. FELKER, ALL OF MARSHFIELD, WISCONSIN.

CATTLE-STANCHION.

1,180,832.  Specification of Letters Patent.  Patented Apr. 25, 1916.

Application filed March 11, 1915. Serial No. 13,583.

*To all whom it may concern:*

Be it known that I, JEREMIAH C. FITZGERALD, a citizen of the United States, residing at Kilbourn, in the county of Columbia and State of Wisconsin, have invented certain new and useful Improvements in Cattle-Stanchions, of which the following is a specification.

This invention relates to certain new and useful improvements in cattle stanchions of the type that are vertically mounted at the ends of stalls or compartments in barns, cow-sheds and the like, for clamping the necks of cows and other animals, in such a manner, as to hold them in their respective stalls until desired, but so as to permit of sufficient movement of the animals for their comfort and feeding, and it consists in certain peculiarities of the construction, novel arrangement and operation of the parts thereof as will be hereinafter more fully set forth and specifically claimed.

The principal object of the invention is to furnish a very simple and inexpensive, yet strong and durable stanchion, the parts of which can be readily adjusted for receiving and holding cattle or animals having necks of different sizes, and also, to provide readily operable means whereby the neck-bars can be easily separated for the release of the animal, or securely held against separation.

Other objects and advantages of the invention will be disclosed in the following description and explanation.

In the accompanying drawing, which serves to illustrate an embodiment of the invention—Figure 1 is a face view of a stanchion embodying my improvements and showing by dotted lines the position to which one of the neck-bars or clamping members can be extended when it is desired to release the neck of the animal; Fig. 2 is an enlarged face view of the upper portion of the stanchion, showing by dotted lines one of the positions to which one of the neck-bars can be adjusted and maintained with respect to the other neck-bar so as to adapt the stanchion to fit animals having different sized necks; Fig. 3 is a central vertical sectional view through the upper portion of the stanchion; Fig. 4 is a cross sectional view taken on line 4—4 of Fig. 2, looking in the direction indicated by the arrows, and Fig. 5 is a plan sectional view taken on line 5—5 of Fig. 2.

Like numerals of reference refer to like parts throughout the different views of the drawing.

The stanchion is shown as being secured at its upper and lower ends by means of chain sections 7 and 8 respectively to an elevated support 9, and a lower support 10, respectively, the upper of which supports may be a horizontally disposed beam or member, and the lower support 10, another horizontally disposed member or a portion of the floor of the stall. Connected to the upper chain section 7 by means of a swivel-member 11 is an adjusting support, which is designated as a whole by the reference numeral 12, and consists of a bar or elongated member 13, having at one of its ends a downwardly extended orificed or apertured projection 14, for the reception and operation of one end of a link 15, which has pivotally secured to said end a gravity-arm 16, which by preference has its lower end deflected as at 17, toward the neck-bar or clamping member adjacent thereto.

By reference to Figs. 1 to 3 inclusive of the drawing, it will be seen that the fulcrum or pivot which unites the arm 16 and link 15 is located at a distance from the upper end of the arm 16, so that said end or portion of said arm will engage the end of the bar or member 13, when the arm is in its lowermost position, as will be readily understood by reference to the drawing. The support 12 is provided at about its middle with a downwardly extended strap or hollow portion 18, and at its end opposite the projection 14 with a longitudinally extended and depending hollow or tubular portion 19, the free end of which is forked or provided with a vertical opening to receive the upper portion of one of the neck-bars or clamping members. The bar or member 13 of the support 12 is provided with a pair of set screws 20 and 21, one of which is located near one of the sides of the hollow extension 18, yet above the same, and the other is located near one of the sides of the hollow extension 19, yet above the same, at its juncture with the bar 13 of the support.

One of the neck-bars, which I will term the swinging neck-bar or clamping member is by preference made of metal, U-shaped or channeled in cross section, and is designated by the reference numeral 22, while the other neck-bar or clamping member 23, which I will term the pivot neck-bar, is also by preference made of metal, U-shaped or channeled in cross section. The open portion of the neck-bars are presented in opposite directions, and each of said bars has by preference longitudinally secured on its surface, adjacent to the other neck-bar, a strip of wood 24, which may be held in place by means of bolts or nuts 25, extended through the wood and metal, but with the heads of the bolts countersunk in the wooden portion, and the nuts located in the channel of the metal portions. The upper portion of the neck-bar 22 is provided with an extension 26, which lies in a substantially horizontal plane, and projects through the strap or hollow extension 18, of the support, and into the hollow extension 19, of said support, in which position it can be held and adjusted with respect to the support 12, by means of the screws 20 and 21, which engage the upper edges of the extension 26, as will be clearly understood by reference to Fig. 4 of the drawing. The lower portion of the neck-bar 22 is provided with a lateral extension 27, which is preferably downwardly bowed, and has in its free portion a series of transverse openings 28, for the reception of a pin or bolt 29, used for pivotally and adjustably connecting the lower end of the neck-bar 23 to the extension 27 of the swinging neck-bar. On its upper portion the swinging neck-bar 22 is provided with a spring clip or catch 30, which may be secured to the neck-bar 22 by one of the bolts 25, which unites the wooden member 24 to said bar, and projects outwardly and horizontally from said bar, and is used to grip or hold the handle or arm 16 in its lowered or locked position. The end of the link or connection 15, opposite that to which the arm 16 is pivoted is screw threaded and extended through a suitable opening in the upper portion of the neck-bar 23, which bar may be secured in place on the said link or connection by means of a nut 31 engaging the screw threaded end of said connection.

From the foregoing and by reference to the drawing, it will be readily understood and clearly seen that the stanchion by reason of its flexible connections with the parts 9 and 10 of any suitable supporting structure will have a swinging and rotary movement to permit of sufficient movement of the animal's neck and head to afford it comfort, yet so as to confine the animal securely within a stall or given area. In order to admit of the animal's head and neck being placed between the neck-bars 22 and 23, it is only necessary to release the arm 16, from the catch 30, which can be easily done by reason of the resiliency of the fingers of said catch, which will readily separate for this purpose, when by moving the arm from the extension 14, the upper portion of the bar 23 will be drawn into the slot in the free portion of the part 19, a sufficient distance to permit the upper portion 32 of the arm 16 to be disengaged from the upper part of the support 12, and extension 14, thus permitting the arm 16 to be raised in substantial alinement with the link 15, when it is apparent said arm can be slid through the hollow extension 14, so that the neck-bar 23 may assume about the position shown by dotted lines in Fig. 1 of the drawing. When in this position, the head of the animal can be placed between the bars 22 and 23, when by drawing the arm 16 and connection 15 in the reverse direction from that just above described, it is apparent that the neck-bar 23 will be moved toward the neck-bar 22 until its upper portion passes into the slot at the free end of the extension 19, when it is obvious that the arm 16 may be allowed to drop, in which operation the clip or catch 30 will engage the lower portion thereof, while the upper part 32 of said arm will engage the upper portion of the bar 13 and extension 14, thus locking the bars in their operative positions. If it is desired to adjust the bars 22 and 23 with respect to one another, so as to fit or accommodate animals having necks of different sizes, it is manifest that this can be done by removing the pin 29, which connects the lower end of the bar 23 to the extension 27, of the bar 22, and moving the bar 23 either outwardly or inwardly as may be desired, where it can again be fastened by inserting the pin 29 through the openings in said bar, as well as the openings 28 in the extension 27 of the swinging bar. The adjustment at the upper end of the stanchion is afforded by loosening the set screws 20 and 21, and sliding the extension 26 on the swinging bar in either direction through the extensions 18 and 19, until the desired adjustment is effected, when by tightening the screws 20 and 21, it is obvious that the bar 22 will be firmly held in the support 12 at the proper position.

Having thus fully described my invention what I claim as new and desire to secure by Letters Patent is—

1. A stanchion consisting of a pair of parallel neck-bars, one of which bars has at each of its ends a portion extended laterally in the direction of the other bar, the last named bar loosely and adjustably connected at one of its ends to one of said extended portions on the other bar, a support adjustably mounted on the other of said extended portions, and a link jointed near its middle and connected at one of its ends to the upper portion of one of said bars and extended along the upper laterally extended portion of the other bar and slidably mounted on said support, and having at its free end means to engage said support when the bars are separated so as to prevent further outward movement or separation thereof, the joint of said link being so positioned and constructed that when the said bars are in their closed positions it will permit one member of said link to depend by its gravity and engage said support with its upper end.

2. In a stanchion, the combination with a pair of upright neck-bars hingedly connected at their lower portions and opening and closing at their upper portions, of a lateral extension on the upper portion of one of said bars projected toward the other bar, a support adjustably mounted on said extension, a locking member connected at one of its ends to the upper portion of the last named bar and extended longitudinally through said extension and having pivoted at its other end a gravity arm, and a catch mounted on the bar adjacent to the gravity arm to receive and hold the same in its lowered position.

3. In a stanchion, the combination with a pair of neck-bars made of material U-shaped in cross section and adjustably hinged together at their lower portions, one of said bars having its upper portion formed with an integral lateral extension projected toward the other bar, and a jointed member located within said extension and connected to the upper portion of the other bar, said jointed member having means to restrict the distance between the upper portions of said bars and to act as a gravity lock when said bars are in their closed positions.

4. In a stanchion, the combination with a pair of neck bars hinged together at their lower portions, one of said neck bars having at its upper portion a lateral extension projected toward the other bar, said lateral projection being U shaped in cross-section and presenting its opening upwardly, a supporting member embracing said U shaped extension, a set screw located in the upper portion of the supporting member near each side thereof and adapted to engage the edges of said extension, and a jointed link slidably mounted in the U shaped extension and in said support and connected at one of its ends to the upper portion of the other bar and adapted to lock by gravity said bars when they are in their closed positions.

JEREMIAH C. FITZGERALD.

Witnesses:
R. D. BARNEY,
A. C. SENNISO.

Copies of this patent may be obtained for five cents each, by addressing the "Commissioner of Patents, Washington, D. C."